(12) United States Patent
Liu et al.

(10) Patent No.: US 11,767,385 B2
(45) Date of Patent: Sep. 26, 2023

(54) BIMODAL POLYETHYLENE COPOLYMER AND FILM THEREOF

(71) Applicant: Univation Technologies, LLC, Houston, TX (US)

(72) Inventors: Bo Liu, Lake Jackson, TX (US); Chuan He, Dunar, WV (US); Daudi A. Abe, The Woodlands, TX (US); Roger L. Kuhlman, Lake Jackson, TX (US); Ayush A. Bafna, Manvel, TX (US); Timothy R. Lynn, Glen Gardner, NJ (US)

(73) Assignee: UNIVATION TECHNOLOGIES LLC, Houston, TX (US)

( * ) Notice: Subject to any disclaimer, the term of this patent is extended or adjusted under 35 U.S.C. 154(b) by 337 days.

(21) Appl. No.: 17/263,176

(22) PCT Filed: Aug. 21, 2019

(86) PCT No.: PCT/US2019/047424
§ 371 (c)(1),
(2) Date: Jan. 26, 2021

(87) PCT Pub. No.: WO2020/046663
PCT Pub. Date: Mar. 5, 2020

(65) Prior Publication Data
US 2021/0179754 A1  Jun. 17, 2021

Related U.S. Application Data

(60) Provisional application No. 62/724,219, filed on Aug. 29, 2018.

(51) Int. Cl.
*C08F 210/16* (2006.01)

(52) U.S. Cl.
CPC ........ *C08F 210/16* (2013.01); *C08F 2500/05* (2013.01); *C08F 2500/12* (2013.01); *C08F 2810/00* (2013.01); *C08J 2323/30* (2013.01)

(58) Field of Classification Search
CPC ............... C08F 210/16; C08F 2500/05; C08F 2500/12; C08F 2810/00; C08J 2323/30
See application file for complete search history.

(56) References Cited

U.S. PATENT DOCUMENTS

| | | | |
|---|---|---|---|
| 3,709,853 A | 1/1973 | Karapinka | |
| 4,003,712 A | 1/1977 | Miller | |
| 4,011,382 A | 3/1977 | Levine et al. | |
| 4,302,566 A | 11/1981 | Karol et al. | |
| 4,543,399 A | 9/1985 | Jenkins, III et al. | |
| 4,588,790 A | 5/1986 | Jenkins, III et al. | |
| 4,882,400 A | 11/1989 | Dumain et al. | |
| 4,994,534 A | 2/1991 | Rhee et al. | |
| 5,332,706 A | 7/1994 | Nowlin et al. | |
| 5,352,749 A | 10/1994 | DeChellis et al. | |
| 5,462,999 A | 10/1995 | Griffin et al. | |
| 5,541,270 A | 7/1996 | Chinh et al. | |
| 5,627,242 A | 5/1997 | Jacobsen et al. | |
| 5,665,818 A | 9/1997 | Tilston et al. | |
| 5,677,375 A | 10/1997 | Rifi et al. | |
| 5,728,335 A | 3/1998 | Neubauer | |
| 5,882,750 A | 3/1999 | Mink et al. | |
| 6,456,976 B1 | 9/2002 | Kuita | |
| 6,489,408 B2 | 12/2002 | Mawson et al. | |
| 6,534,604 B2 | 3/2003 | Loveday et al. | |
| 6,787,608 B2* | 9/2004 | VanDun | C08L 23/08 525/240 |
| 6,878,454 B1* | 4/2005 | Shannon | C08L 23/0815 525/240 |
| 6,989,344 B2 | 1/2006 | Cann et al. | |
| 6,989,423 B2 | 1/2006 | Wagner et al. | |
| 7,078,467 B1 | 7/2006 | Kolb et al. | |
| 7,090,927 B2* | 8/2006 | Shannon | C08L 23/0815 525/240 |
| 7,157,531 B2 | 1/2007 | Szul et al. | |
| 7,223,825 B2 | 5/2007 | Kolb et al. | |
| 7,300,988 B2 | 11/2007 | Kolb et al. | |
| 7,829,641 B2* | 11/2010 | Etherton | C08F 210/16 526/170 |
| 8,227,552 B2 | 7/2012 | Kolb et al. | |
| 8,497,329 B2 | 7/2013 | Kolb et al. | |
| 9,732,172 B2* | 8/2017 | Kim | C08F 210/16 |
| 10,435,493 B2* | 10/2019 | Buryak | H01B 3/441 |
| 10,913,831 B2* | 2/2021 | Mure | C08J 5/18 |
| 11,572,461 B2* | 2/2023 | Tupe | C08F 210/16 |
| 2002/0150648 A1 | 10/2002 | Cree | |
| 2005/0085600 A1* | 4/2005 | Ehrman | C08F 10/00 526/905 |
| 2006/0173123 A1 | 8/2006 | Yang et al. | |

(Continued)

FOREIGN PATENT DOCUMENTS

| | | |
|---|---|---|
| EP | 0634421 | 1/1995 |
| EP | 0649992 | 4/1995 |

(Continued)

OTHER PUBLICATIONS

PCT/US2019/047424, International Search Report and Written Opinion dated Nov. 27, 2019.

*Primary Examiner* — Rip A Lee

(57) ABSTRACT

A bimodal ethylene-co-1-butene copolymer consisting essentially of a higher molecular weight component and a lower molecular weight component and, when in melted form at 190 degrees Celsius, is characterized by a unique melt property space defined by a combination of high-load melt index, melt flow ratio, and melt elasticity properties. A (blown) film consisting essentially of the bimodal ethylene-co-1-butene copolymer and having improved properties. Methods of synthesizing the bimodal ethylene-co-1-butene copolymer and making the blown film. A manufactured article comprising the bimodal ethylene-co-1-butene copolymer.

10 Claims, No Drawings

(56) References Cited

U.S. PATENT DOCUMENTS

| | | | |
|---|---|---|---|
| 2006/0188734 A1 | 8/2006 | Valentage et al. | |
| 2009/0304966 A1* | 12/2009 | Mehta | C08F 210/16 428/36.9 |
| 2016/0068623 A1 | 3/2016 | Kapur et al. | |
| 2016/0297907 A1 | 10/2016 | Goode et al. | |
| 2017/0129977 A1 | 5/2017 | Martin et al. | |

FOREIGN PATENT DOCUMENTS

| | | |
|---|---|---|
| EP | 0794200 | 9/1997 |
| EP | 0802202 | 10/1997 |
| WO | 2017/132092 | 8/2017 |
| WO | 2018/147968 | 8/2018 |

\* cited by examiner

BIMODAL POLYETHYLENE COPOLYMER AND FILM THEREOF

FIELD

Polyethylene copolymers, films, manufactured articles, and related methods.

INTRODUCTION

Patent application publications in or about the field include US 2016/0068623 A1; US 2016/0297907 A1; and WO 2017/132092 A1. Patents in or about the field include U.S. Pat. Nos. 5,332,706; 5,882,750; 6,989,344 B2; U.S. Pat. Nos. 7,078,467 B1; 7,090,927 B2; 7,157,531 B2; 7,223,825 B2; 7,300,988 B2; 8,227,552 B2 and 8,497,329 B2.

SUMMARY

A bimodal ethylene-co-1-butene copolymer consisting essentially of a higher molecular weight (HMW) component and a lower molecular weight (LMW) component and, when in melted form at 190 degrees Celsius (° C.), is characterized by a melt property space and is useful for making a blown film having a film property space.

A method of synthesizing the bimodal ethylene-co-1-butene copolymer; a (blown) film consisting essentially of the bimodal ethylene-co-1-butene copolymer ("the film"); and a manufactured article comprising the bimodal ethylene-co-1-butene copolymer.

DETAILED DESCRIPTION

The Summary and Abstract are incorporated here by reference. Certain embodiments are described below as numbered aspects for easy cross-referencing.

Aspect 1. A bimodal ethylene-co-1-butene ("BiEtBu") copolymer consisting essentially of a higher molecular weight (HMW) component and a lower molecular weight (LMW) component and, when in melted form at 190° C., is characterized by a melt property space defined by a combination of high-load melt index ("HLMI" or "$I_{21}$"), melt flow ratio $I_{21}/I_5$ ("MFR5"), and melt elasticity (G'/G"@0.1 rad/s) properties, wherein the HLMI is 8.0 to 12.0 grams per 10 minutes (g/10 min.), alternatively 8.1 to 11.0 g/10 min., alternatively 8.1 to 10.4 g/10 min. and is measured according to ASTM D1238-13 (190° C., 21.6 kg); the MFR5 is 25.0 to 37.0, alternatively 26.0 to 36.0, alternatively 27.4 to 33.9 wherein the $I_{21}$ and $I_5$ values used to calculate the MFR5 are each in g/10 min. and are measured according to ASTM D1238-13 (190° C., 21.6 kg, "$I_{21}$"; and 190° C., 5.0 kg, "$I_5$", respectively), and the melt elasticity is 0.55 to 0.68, alternatively 0.56 to 0.66, alternatively 0.57.5 to 0.640, and wherein melt elasticity=G'/G" determined at 0.1 radian per second (rad/s) according to Melt Elasticity Test Method (described herein); and wherein the HMW component has a weight-average molecular weight ($M_{w\text{-}HMW}$) greater than 425,000 g/mol. The "/" means division. The melt elasticity characterizes the relationship between melt storage modulus (G') and loss modulus (G") at the dynamic frequency of 0.1 rad/s. This relationship is useful for evaluating polyethylene resins for film applications. With "consisting essentially of", the BiEtBu copolymer is free of a distinct third or more component as determined by gel permeation chromatography (GPC) measured according to the GPC Test Method.

Aspect 2. The BiEtBu copolymer of aspect 1 wherein the melt property space of the BiEtBu copolymer is further defined by any one of limitations (i) to (vii): (i) a melt index $I_2$ from 0.005 to 0.10, alternatively 0.009 to 0.094, alternatively 0.010 to 0.080 g/10 min. measured according to ASTM D1238-13 (190° C., 2.16 kg, "$I_2$"); (ii) a melt index $I_5$ from 0.25 to 0.40, alternatively from 0.28 to 0.35, alternatively from 0.285 to 0.344 g/10 min., measured according to ASTM D1238-13 (190° C., 5.0 kg, "$I_5$") (iii) a melt flow ratio $I_{21}/I_2$ ("MFR2") from 100.0 to 150.0, alternatively 105 to 145.0, alternatively 110 to 143 wherein the $I_{21}$ and $I_2$ values used to calculate the MFR2 are each in g/10 min. and are measured according to ASTM D1238-13 (190° C., 21.6 kg, "$I_{21}$"; and 190° C., 2.16 kg, "$I_2$", respectively); (iv) both (i) and (ii); (v) both (i) and (iii); (vi) both (ii) and (iii); and (vii) each of (i) to (iii).

Aspect 3. The BiEtBu copolymer of aspect 1 or 2 characterized by any one of resin property limitations (i) to (xxxiii): (i) a density from 0.9410 to 0.9550 gram per cubic centimeter (g/cm$^3$), alternatively 0.9450 to 0.9530 g/cm$^3$, alternatively 0.9480 to 0.9500 g/cm$^3$, measured according to ASTM D792-13, Method B; (ii) a component fraction split characterized by a weight fraction of the HMW component from 50.0 to 60.0 wt %, alternatively from 55.0 to 59.4 wt %, alternatively from 55.5 to 58.9 wt %; and a weight fraction of the LMW component fraction is from 50.0 to 40.0 wt %, alternatively from 45.0 to 40.6 wt %, alternatively from 44.5 to 41.1 wt % of the combined weight of the HMW and LMW components, measured according to the Gel Permeation Chromatography (GPC) Test Method; (iii) a component molecular weight spread characterized by a ratio of the weight-average molecular weight of the HMW component ($M_{w\text{-}HMW}$) to the weight-average molecular weight of the LMW component ($M_{w\text{-}LMW}$) (i.e., $M_{w\text{-}HMW}/M_{w\text{-}LMW}$ ratio) from 35.0 to 45.0, alternatively 38.0 to 44, alternatively 38.5 to 42.0, measured according to the GPC Test Method; (iv) a molecular mass dispersity ($M_w/M_n$), Đ$_M$, from 34 to 44, alternatively from 35 to 43, alternatively from 36.0 to 40.4, wherein $M_w$ and $M_n$ are measured according to the GPC Test Method; (v) the $M_{w\text{-}HMW}$ is from 435,000 to 465,000 g/mol, alternatively from 445,000 to 461,000 g/mol, alternatively from 451,000 to 461,000 g/mol measured according to the GPC Test Method; (vi) a number-average molecular weight ($M_n$) from 6,900.0 to 8,000.0 g/mol; (vii) a weight-average molecular weight ($M_w$) from 250,000.0 to 300,000.0 g/mol; (viii) a z-average molecular weight ($M_z$) from 1,800,000.0 to 2,500,000.0 g/mol; (ix) both (i) and (ii); (x) both (i) and (iii); (xi) both (i) and (iv); (xii) both (i) and (v); (xiii) both (i) and (vi); (xiv) both (i) and (vii); (xvi) both (i) and (viii); (xvii) both (ii) and (iii); (xviii) both (ii) and (iv); (xix) both (ii) and (v); (xx) both (ii) and (vi); (xxi) both (ii) and (vii); (xxii) both (ii) and (viii); (xxiii) both (iii) and (iv); (xxiv) both (iii) and (v); (xxv) both (iii) and (vi); (xxvi) both (iii) and (vii); (xxvii) both (iii) and (viii); (xxviii) both (iv) and (v); (xxix) both (iv) and (vi); (xxx) both (iv) and (vii); (xxxi) both (iv) and (viii); (xxxii) any seven of (i) to (viii); and (xxxiii) each of (i) to (viii). In some aspects the BiEtBu copolymer may have a transition metal content, alternatively a Zr content, of less than 10 weight parts per million (ppm) measured according to inductively coupled plasma mass spectrometry (ICP-MS).

Aspect 4. The BiEtBu copolymer of any one of aspects 1 to 3 that, when characterized in the form of a blown film and having a thickness of 0.0127 millimeter (mm, 12.7 micrometer (μm), 0.500 mil), is characterized by any one of limitations (i) to (xii): (i) a dart impact from 271 to 401 grams (g), alternatively 291 to 399 g, alternatively 294 to 395 g, measured according to the Dart Impact Test Method; (ii) a gauge variation from 10.0% to 16%, alternatively from 10.5% to 15.4%, alternatively from 11.0% to 14.2%, measured according to the Gauge Variation Test Method; (iii) a bubble stability rating, at maximum line speed (MLS) 76.2 meters per minute (250 feet per minute (ft/min.)), of 3, 4, or 5, alternatively 3 or 4; alternatively 4, alternatively 5 measured according to the Bubble Stability Test Method (maximum rating is 5); (iv) an Elmendorf tear in cross direction (CD) from 60.0 to 190.0 gram-force (gf), alternatively 61 to 185 gf, alternatively 83 to 182 gf and/or an Elmendorf tear in machine direction (MD) from 15 to 35 gf, alternatively 17 to 33 gf, alternatively 18 to 32 gf, measured according to the Elmendorf Tear Test Method; (v) both (i) and (ii); (vi) both (i) and (iii); (vii) both (i) and (iv); (viii) both (ii) and (iii); (ix) both (ii) and (iv); (x) both (iii) and (iv); (xi) any three of (i) to (iv); and (xii) each of (i) to (iv).

Aspect 5. A method of synthesizing the BiEtBu copolymer of any one of aspects 1 to 4, the method consisting essentially of (a) copolymerizing ethylene (monomer) and 1-butene (comonomer) with a combination of a bimodal catalyst system and a trim catalyst in the presence of molecular hydrogen gas ($H_2$) and, optionally, an induced condensing agent (ICA) in one polymerization reactor (e.g., one fluidized bed, gas phase polymerization reactor (FB-GPP reactor)) under effective polymerizing conditions to give an initial BiEtBu copolymer, (b) removing the initial BiEtBu copolymer from the reactor (e.g., the FB-GPP reactor) to give a removed BiEtBu copolymer, and oxygen tailoring the removed BiEtBu copolymer to give an oxygen-tailored BiEtBu copolymer. The bimodal catalyst system is made by contacting a first activator with bis(2-(pentamethylphenylamido)ethyl)-amine zirconium dibenzyl and a bis(butylcyclopentadienyl)zirconium dihalide; wherein the trim catalyst is made by contacting a second activator with bis(butylcyclopentadienyl)zirconium dialkyl; wherein the first and second activators are the same or different. The effective polymerizing conditions comprise a reaction temperature from 85 degrees (°) to 95° Celsius (C.), alternatively 87° to 93° C., alternatively 89° to 91° C.; a molar ratio of the molecular hydrogen gas to the ethylene ($H_2/C_2$ molar ratio) from 0.001 to 0.010, alternatively 0.025 to 0.065, alternatively 0.040 to 0.045; a molar ratio of the 1-butene ("$C_4$") to the ethylene ($C_4/C_2$ molar ratio) from 0.0001 to 0.10, alternatively 0.005 to 0.050, alternatively 0.008 to 0.030, alternatively 0.015 to 0.025. In some aspects the bis(butylcyclopentadienyl)zirconium dihalide is bis(butylcyclopentadienyl)zirconium dichloride; and the bis(butylcyclopentadienyl)zirconium dialkyl is bis(butylcyclopentadienyl)zirconium dimethyl or bis(butylcyclopentadienyl)zirconium diethyl, alternatively bis(butylcyclopentadienyl)zirconium dimethyl. In some aspects the first activator is an alkylaluminoxane (alkylalumoxane) and the second activator independently is an alkylaluminoxane or an alkylaluminum compound. With "consisting essentially of", the method is free of Ziegler-Natta catalysts and chrome catalysts, and the polymerizing is carried out in a single reactor (i.e., in the FB-GPP reactor), and the operating conditions are effective for imparting the unique combination of high-load melt index, melt flow ratio, and melt elasticity properties to the BiEtBu copolymer. Other than that, the method is not particularly limited. Between steps (b) and (c), the method may further comprise purging the removed BiEtBu copolymer with an inert gas (e.g., $N_2$) to remove entrained hydrocarbons therefrom and/or treating the removed BiEtBu copolymer with a stream of humidified nitrogen ($N_2$) gas to deactivate in situ any residual amount of the bimodal catalyst system contained therein to give a purged BiEtBu copolymer. In some aspects the method further comprises between steps (b) and (c) degassing the removed or purged BiEtBu copolymer to remove volatile organic compounds therefrom to give a degassed BiEtBu copolymer. In some aspects the method further comprises pelletizing the removed, purged, or degassed BiEtBu copolymer to give pellets thereof (pelletized BiEtBu copolymer). The (c) oxygen tailoring step may be performed as part of an extruding operation. In some aspects the method further comprises melt mixing or extruding a melt of the removed, purged, or degassed bimodal ethylene-co-1-butene copolymer. The extrusion operation may be done in an extruder (e.g., an LCM100 extruder made by KOBE STEEL LTD).

Aspect 6. The method of aspect 5 further consisting essentially of adding at least one additive (e.g., an antioxidant) to the oxygen-tailored BiEtBu copolymer to give a formulation comprising the oxygen-tailored BiEtBu copolymer and the at least one additive. The at least one additive may be added during the extrusion operation of aspect 5. The at least one additive may be one or more film additives useful in polyethylene films. The combining may comprise melt mixing the one or more film additives into a melt of the BiEtBu copolymer. Alternatively, the combining may comprise soaking or injecting the one or more film additives into the pellets of the pelletized BiEtBu copolymer.

Aspect 7. A manufactured article comprising the BiEtBu copolymer of any one of aspects 1 to 4.

Aspect 8. A film consisting essentially of the BiEtBu copolymer of any one of aspects 1 to 4 ("the film") and characterized when at a thickness of 0.013 millimeter or greater as having a dart impact of greater than 290 grams measured by the Dart Impact Test Method. The "consisting essentially of" transitional phrase means the film is free of other polyolefin polymers, but otherwise its constituents are not particularly limited. The film may be used in packaging applications to protect a substance in need of covering, wherein the film is disposed to at least partially cover the substance. Examples of substances in need of covering are paper, paperboard (e.g., cardboard), food, pharmaceutical compounds, and a stack of paperboard boxes (e.g., wherein the film is a shrink wrap used for wrapping a pallet stacked with paperboard boxes). The film may be the blown film as made in aspect 9 or of aspect 10.

Aspect 9. A method of making a blown film, the method comprising extruding a melt of the BiEtBu copolymer of any one of aspects 1 to 4 through a die configured for forming a bubble so as to make a bubble of the BiEtBu copolymer, and blowing (inflating) the bubble with a film-blowing machine, thereby making the blown film. The bubble is restricted in one dimension. The blown film may be made or fabricated without internal bubble cooling (IBC) by any suitable method, including high stalk film blowing without IBC, such as by using a high stalk film blowing manufacturing line without (active) IBC equipment. The blown film consists essentially of the BiEtBu copolymer of any one of aspects 1 to 4 ("the blown film"). The "consisting essentially of" transitional phrase means the blown film is free of other polyolefin polymers, but otherwise its constituents are not particularly limited.

Aspect 10. A blown film made by the method of aspect 9 and consisting essentially of the BiEtBu copolymer of any one of aspects 1 to 4 ("the blown film"). With "consisting essentially of", the blown film is free of other polyolefin polymers, but otherwise its constituents are not particularly limited. The blown film may be characterized by a unique film property space that includes at least one of decreased gauge (thickness) variation, a moderate or good bubble stability rating, and/or enhanced (increased) toughness (tear or dart impact) and/or enhanced gauge variation (decreased film thickness variability). The blown film may be used in the packaging applications.

Activator. A substance, other than the catalyst or one of the substrates, that increases the rate of a catalyzed reaction without itself being consumed. Typically, the activator contains aluminum and/or boron.

Alkyl groups are named using IUPAC nomenclature. E.g., methyl, ethyl, propyl, butyl, pentyl, and hexyl mean compounds of formula —$(CH_2)_nCH_3$, wherein subscript n is 0, 1, 2, 3, 4, or 5, respectively. Prefixes iso, tert, tertiary, normal, n-, secondary, sec- and the like are not used except parenthetically as reference. E.g., 1-methylethyl is used instead of isopropyl, 1,1-dimethylethyl instead of tert-butyl, and so on.

Bimodal. Two, and only two, modalities or modes.

Bimodal referring to a copolymer generally means a composition consisting essentially of a higher molecular weight polymer component and a lower molecular weight polymer component. Bimodal polymer compositions may be characterized by two peaks separated by a distinguishable local minimum therebetween in a plot of dW/d Log(MW) on the y-axis versus Log(MW) on the x-axis to give a Gel Permeation Chromatograph (GPC) chromatogram, wherein Log(MW) and dW/d Log(MW) are as defined herein.

Bimodal referring to a catalyst system generally means a catalyst system that contains two distinctly different catalysts for catalyzing a same polymerization process (e.g., olefin polymerization) and producing a bimodal polymer composition.

Catalyst. A material that enhances rate of a reaction (e.g., the polymerization of ethylene and 1-butene) and is not completely consumed thereby.

Catalyst system. A combination of a catalyst per se and a companion material such as a modifier compound for attenuating reactivity of the catalyst, a support material on which the catalyst is disposed, a carrier material in which the catalyst is disposed, or a combination of any two or more thereof, or a reaction product of a reaction thereof.

Consisting essentially of, consist(s) essentially of, and the like. Partially-closed ended expressions that exclude anything that would affect the basic and novel characteristics of that which they describe, but otherwise allow anything else. In some aspects any one, alternatively each "comprising" or "comprises" may be replaced by "consisting essentially of" or "consists essentially of", respectively; alternatively by "consisting of" or "consists of", respectively.

Consisting of and consists of. Closed ended expressions that exclude anything that is not specifically described by the limitation that it modifies. In some aspects any one, alternatively each expression "consisting essentially of" or "consists essentially of" may be replaced by the expression "consisting of" or "consists of", respectively.

Dry. Generally, a moisture content from 0 to less than 5 parts per million based on total parts by weight. Materials fed to the reactor(s) during a polymerization reaction are dry.

Feed. Quantity of reactant or reagent that is added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Feed line. A pipe or conduit structure for transporting a feed.

Film: an article restricted in one dimension. The restricted dimension may be called a thickness of the film, and the thickness (gauge variation) is substantially uniform therein. Claimed film properties are measured on 13 (12.7) micrometers thick monolayer films.

Inert. Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Internal bubble cooling or IBC is an aspect of film blowing performed by actively using ancillary, special purpose IBC equipment such as that of US 2002/0150648 A1 to R. E. Cree.

Metallocene catalyst. Homogeneous or heterogeneous material that contains a cyclopentadienyl ligand-metal complex and enhances olefin polymerization reaction rates. Substantially single site or dual site. Each metal is a transition metal Ti, Zr, or Hf. Each cyclopentadienyl ligand independently is an unsubstituted cyclopentadienyl group or a hydrocarbyl-substituted cyclopentadienyl group.

Trim catalyst. A quantity of a metallocene catalyst that is identical, except for X group described later, to the metallocene catalyst of the bimodal catalyst system. Trim catalyst is usually fed (e.g., to the FB-GPP reactor) as a solution of the catalyst dissolved in an inert liquid (non-polar, aprotic, e.g., hydrocarbon solvent). The trim catalyst is used with the bimodal catalyst system to modify at least one property of the copolymer made thereby. Examples of such at least one property are density, melt index $I_2$, flow index $I_{21}$, melt flow ratio ($I_{21}/I_2$), and molecular mass dispersity ($M_w/M_n$), $Đ_M$.

Ziegler-Natta catalysts. Heterogeneous materials that enhance olefin polymerization reaction rates and are prepared by contacting inorganic titanium compounds, such as titanium halides supported on a magnesium chloride support, with an activator.

Polymerization Reactor and Method

In an illustrative pilot plant process for making the BiEtBu copolymer, a fluidized bed, gas-phase polymerization reactor ("FB-GPP reactor") having a reaction zone dimensioned as 304.8 mm (twelve inch) internal diameter and a 2.4384 meter (8 feet) in straight-side height and containing a fluidized bed of granules of the BiEtBu copolymer. Configure the FB-GPP reactor with a recycle gas line for flowing a recycle gas stream. Fit the FB-GPP reactor with gas feed inlets and polymer product outlet. Introduce gaseous feeds of ethylene and hydrogen together with comonomer (e.g., 1-butene) below the FB-GPP reactor bed into the recycle gas line.

Polymerization operating conditions are any variable or combination of variables that may affect a polymerization reaction in the GPP reactor or a composition or property of a BiEtBu copolymer product made thereby. The variables may include reactor design and size, catalyst composition and amount; reactant composition and amount; molar ratio of two different reactants; presence or absence of feed gases such as $H_2$ and/or $O_2$, molar ratio of feed gases versus reactants, absence or concentration of interfering materials (e.g., $H_2O$), absence or presence of an induced condensing agent (ICA), average polymer residence time in the reactor, partial pressures of constituents, feed rates of monomers, reactor bed temperature (e.g., fluidized bed temperature), nature or sequence of process steps, time periods for transitioning between steps. Variables other than that/those being described or changed by the method or use may be kept constant.

In operating the polymerization method, control individual flow rates of ethylene ("$C_2$"), hydrogen ("$H_2$") and 1-butene ("C$_4$" or "C$_X$" wherein x is 4) to maintain a fixed comonomer to ethylene monomer gas molar ratio (C$_X$/C$_2$, e.g., C$_4$/C$_2$) equal to a described value (e.g., 0.0050), a constant hydrogen to ethylene gas molar ratio ("H$_2$/C$_2$") equal to a described value (e.g., 0.0020), and a constant ethylene ("C$_2$") partial pressure equal to a described value (e.g., 1,000 kPa). Measure concentrations of gases by an in-line gas chromatograph to understand and maintain composition in the recycle gas stream. Maintain a reacting bed of growing polymer particles in a fluidized state by continuously flowing a make-up feed and recycle gas through the reaction zone. Use a superficial gas velocity of 0.49 to 0.67 meter per second (m/sec) (1.6 to 2.2 feet per second (ft/sec)). Operate the FB-GPP reactor at a total pressure of about 2344 to about 2413 kilopascals (kPa) (about 340 to about 350 pounds per square inch-gauge (psig)) and at a described first reactor bed temperature RBT. Maintain the fluidized bed at a constant height by withdrawing a portion of the bed at a rate equal to the rate of production of particulate form of the BiEtBu copolymer, which production rate may be from 10 to 20 kilograms per hour (kg/hr), alternatively 13 to 18 kg/hr. Remove the product BiEtBu copolymer semi-continuously via a series of valves into a fixed volume chamber, wherein this removed BiEtBu copolymer is purged to remove entrained hydrocarbons and treated with a stream of humidified nitrogen (N$_2$) gas to deactivate any trace quantities of residual catalyst.

The bimodal catalyst system may be fed into the polymerization reactor(s) in "dry mode" or "wet mode", alternatively dry mode, alternatively wet mode. The dry mode is a dry powder or granules. The wet mode is a suspension in an inert liquid such as mineral oil.

Gas molar ratio of comonomer to ethylene ("C$_X$/C$_2$ gas molar ratio") is the quantity of all alpha-olefin comonomer(s) (e.g., 1-butene "C$_4$"), in moles, being fed in a gaseous or vaporous state into the GPP reactor divided by the quantity of ethylene monomer (C$_2$), in moles, being fed in a gaseous state into the GPP reactor. The moles of comonomer and moles of ethylene are measured by gas flow meters or other suitable means.

Ethylene partial pressure (e.g., C2P) in the GPP reactor. From 690 to 2070 kilopascals (kPa, i.e., from 100 to 300 psia (pounds per square inch absolute)); alternatively from 830 to 1655 kPa (120 to 240 psia), alternatively from 1300 to 1515 kPa (190 to 220 psia). Alternatively, the partial pressure of ethylene may be from 690 to 3450 kilopascals (kPa, 100 to 500 pounds per square inch absolute (psia)), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

Induced condensing agent (ICA). An inert liquid useful for cooling materials in the polymerization reactor(s) (e.g., a fluidized bed reactor); its use is optional. The ICA may be a (C$_5$-C$_{20}$)alkane, alternatively a (C$_{11}$-C$_{20}$)alkane, alternatively a (C$_5$-C$_{10}$)alkane, alternatively a (C$_5$)alkane, e.g., pentane or 2-methylbutane; a hexane; a heptane; an octane; a nonane; a decane; or a combination of any two or more thereof. The ICA may be 2-methylbutane (i.e., isopentane). Aspects of the method of polymerization that use the ICA may be referred to as being an induced condensing mode operation (ICMO). ICMO is described in U.S. Pat. Nos. 4,453,399; 4,588,790; 4,994,534; 5,352,749; 5,462,999; and 6,489,408. Measure concentration of ICA in gas phase measured using gas chromatography by calibrating peak area percent to mole percent (mol %) with a gas mixture standard of known concentrations of ad rem gas phase components. Concentration of ICA may be from 1 to 15 mol %, alternatively from 4 to 14 mol %, alternatively from 9 to 12 mol %.

The polymerization method uses a gas-phase polymerization (GPP) reactor, such as a stirred-bed gas phase polymerization reactor (SB-GPP reactor) or a fluidized-bed gas-phase polymerization reactor (FB-GPP reactor), to make the BiEtBu copolymer. Such reactors and methods are generally well-known in the art. For example, the FB-GPP reactor/method may be as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These SB-GPP and FB-GPP polymerization reactors and processes either mechanically agitate or fluidize by continuous flow of gaseous monomer and diluent the polymerization medium inside the reactor, respectively. Other useful reactors/processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

The polymerization conditions may further include one or more additives such as a chain transfer agent or a promoter. The chain transfer agents are well known and may be alkyl metal such as diethyl zinc. Promoters are known such as in U.S. Pat. No. 4,988,783 and may include chloroform, CFCl$_3$, trichloroethane, and difluorotetrachloroethane. Prior to reactor start up, a scavenging agent may be used to react with moisture and during reactor transitions a scavenging agent may be used to react with excess activator. Scavenging agents may be a trialkylaluminum. Gas phase polymerizations may be operated free of (not deliberately added) scavenging agents. The polymerization conditions for gas phase polymerization reactor/method may further include an amount (e.g., 0.5 to 200 ppm based on all feeds into reactor) of a static control agent and/or a continuity additive such as aluminum stearate or polyethyleneimine. The static control agent may be added to the FB-GPP reactor to inhibit formation or buildup of static charge therein.

Start-up or restart of the GPP reactor may be illustrated with a fluidized bed, GPP reactor. The start-up of a recommissioned FB-GPP reactor (cold start) or restart of a transitioning FB-GPP reactor (warm start) includes a time period that is prior to reaching steady-state polymerization conditions of step (a). Start-up or restart may include the use of a polymer seedbed preloaded or loaded, respectively, into the fluidized bed reactor. The polymer seedbed may be composed of powder of a polyethylene such as a polyethylene homopolymer or previously made batch of the BiEtBu copolymer.

Start-up or restart of the FB-GPP reactor may also include gas atmosphere transitions comprising purging air or other unwanted gas(es) from the reactor with a dry (anhydrous) inert purge gas, followed by purging the dry inert purge gas from the FB-GPP reactor with dry ethylene gas. The dry inert purge gas may consist essentially of molecular nitrogen (N$_2$), argon, helium, or a mixture of any two or more thereof. When not in operation, prior to start-up (cold start), the FB-GPP reactor contains an atmosphere of air. The dry inert purge gas may be used to sweep the air from a recommissioned FB-GPP reactor during early stages of start-up to give a FB-GPP reactor having an atmosphere consisting of the dry inert purge gas. Prior to restart (e.g., after a change in seedbeds), a transitioning FB-GPP reactor may contain an atmosphere of unwanted ICA or other unwanted gas or vapor. The dry inert purge gas may be used to sweep the unwanted vapor or gas from the transitioning FB-GPP reactor during early stages of restart to give the FB-GPP reactor an atmosphere consisting of the dry inert purge gas. Any dry inert purge gas may itself be swept from the FB-GPP reactor with the dry ethylene gas. The dry ethylene gas may further contain molecular hydrogen gas such that the dry ethylene gas is fed into the fluidized bed reactor as a mixture thereof. Alternatively the dry molecular hydrogen gas may be introduced separately and after the atmosphere of the fluidized bed reactor has been transitioned to ethylene. The gas atmosphere transitions may be done prior to, during, or after heating the FB-GPP reactor to the reaction temperature of the polymerization conditions.

Start-up or restart of the FB-GPP reactor also includes introducing feeds of reactants and reagents thereinto. The reactants include the ethylene and the alpha-olefin (e.g., 1-butene). The reagents fed into the fluidized bed reactor include the molecular hydrogen gas and the induced condensing agent (ICA) and the bimodal catalyst system (e.g., PRODIGY™ BMC-300 catalyst) and the trim catalyst.

In an embodiment the method uses a pilot scale fluidized bed gas phase polymerization reactor (Pilot Reactor) that comprises a reactor vessel containing a fluidized bed of a powder of the BiEtBu copolymer, and a distributor plate disposed above a bottom head, and defining a bottom gas inlet, and having an expanded section, or cyclone system, at the top of the reactor vessel to decrease amount of resin fines that may escape from the fluidized bed. The expanded section defines a gas outlet. The Pilot Reactor further comprises a compressor blower of sufficient power to continuously cycle or loop gas around from out of the gas outlet in the expanded section in the top of the reactor vessel down to and into the bottom gas inlet of the Pilot Reactor and through the distributor plate and fluidized bed. The Pilot Reactor further comprises a cooling system to remove heat of polymerization and maintain the fluidized bed at a target temperature. Compositions of gases such as ethylene, alpha-olefin (e.g., 1-butene), hydrogen, and oxygen being fed into the Pilot Reactor are monitored by an in-line gas chromatograph in the cycle loop in order to maintain specific concentrations that define and enable control of polymer properties. In some embodiments the gases are cooled, resulting in their temperature dropping below their dew point, at which time the Pilot Reactor is in condensing mode operation (CMO) or induced condensing mode operation (ICMO). In CMO, liquids are present downstream of the cooler and in the bottom head below the distributor plate. The bimodal catalyst system (e.g., PRODIGY™ BMC-300) may be fed as a slurry or dry powder into the Pilot Reactor from high pressure devices, wherein the slurry is fed via a syringe pump and the dry powder is fed via a metered disk. The bimodal catalyst system typically enters the fluidized bed in the lower ⅓ of its bed height. The Pilot Reactor further comprises a way of weighing the fluidized bed and isolation ports (Product Discharge System) for discharging the powder of BiEtBu copolymer from the reactor vessel in response to an increase of the fluidized bed weight as polymerization reaction proceeds.

In some embodiments the FB-GPP reactor is a commercial scale reactor such as a UNIPOL™ reactor or UNIPOL™ II reactor, which are available from Univation Technologies, LLC, a subsidiary of The Dow Chemical Company, Midland, Michigan, USA.

Catalysts, Support Materials, Activators

The bimodal catalyst system used in the method of synthesizing may consist essentially of a metallocene catalyst and a non-metallocene molecular catalyst, which are different in functional ligand and/or catalytic metal M. The bimodal catalyst system may also consist essentially of a solid support material and/or at least one activator and/or at least one activator species, which is a by-product of reacting the metallocene catalyst or non-metallocene molecular catalyst with the first activator. The metallocene catalyst of the bimodal catalyst system may be bis(butylcyclopentadienyl) zirconium dihalide and the non-metallocene molecular catalyst of the bimodal catalyst system may be bis(2-(pentamethylphenylamido)ethyl)-amine zirconium dibenzyl. The bimodal catalyst system may be PRODIGY BMC-300, available from Univation Technologies LLC, Houston, Texas, USA.

Without being bound by theory, it is believed that the bis(2-(pentamethylphenylamido)ethyl)-amine zirconium dibenzyl is effective for making the HMW component of the BiEtBu copolymer and each of the bis(butylcyclopentadienyl)zirconium dihalide and bis(butylcyclopentadienyl)zirconium dialkyl is independently effective for making the LMW component of the BiEtBu copolymer. The molar ratio of the two catalysts of the bimodal catalyst system may be based on the molar ratio of their respective catalytic metal atom (M, e.g., Zr) contents, which may be calculated from ingredient weights thereof or may be analytically measured.

In an alternative embodiment of the method of making the BiEtBu copolymer, any one or both of the bis(butylcyclopentadienyl)zirconium dihalide (i.e., (butylcyclopentadienyl)$_2$MX$_2$ wherein each X is halide) and the bis(butylcyclopentadienyl)zirconium dialkyl (i.e., (butylcyclopentadienyl)$_2$MX$_2$ wherein each X is alkyl) may be independently replaced with any one of the following metallocene catalysts: (pentamethylcyclopentadienyl)(propylcyclopentadienyl)MX$_2$; (tetramethylcyclopentadienyl)(propylcyclopentadienyl)MX$_2$; (tetramethylcyclopentadienyl)(butylcyclopentadienyl)MX$_2$; bridged (CH$_3$)$_2$Si (indenyl)MX$_2$; bridged (CH$_3$)$_2$Si(4,5,6,7-tetrahydro-indenyl)MX$_2$; (propylcyclopentadienyl)$_2$MX$_2$; (1-methyl-3-butyl-cyclopentadienyl)$_2$MX$_2$; wherein each M is independently zirconium (Zr) or hafnium (Hf); and wherein each X is independently selected from F, Cl, Br, I, —CH$_3$, —CH$_2$CH$_3$, benzyl, —CH$_2$Si(CH$_3$)$_3$, a (C$_1$-C$_5$)alkyl, and a (C$_2$-C$_5$)alkenyl.

The catalysts of the bimodal catalyst system may be disposed by spray-drying onto a solid support material prior to being contacted with an activator. The solid support material may be uncalcined or calcined prior to being contacted with the catalysts. The solid support material may be a hydrophobic fumed silica (e.g., a fumed silica treated with dimethyldichlorosilane). The bimodal (unsupported or supported) catalyst system may be in the form of a powdery, free-flowing particulate solid.

Support material. The support material may be an inorganic oxide material. The terms "support" and "support material" are the same as used herein and refer to a porous inorganic substance or organic substance. In some embodiments, desirable support materials may be inorganic oxides that include Group 2, 3, 4, 5, 13 or 14 oxides, alternatively Group 13 or 14 atoms. Examples of inorganic oxide-type support materials are silica, alumina, titania, zirconia, thoria, and mixtures of any two or more of such inorganic oxides. Examples of such mixtures are silica-chromium, silica-alumina, and silica-titania.

Each of the catalyst compounds of the bimodal catalyst system independently may be unsupported, alternatively supported on a support material, in which latter case the bimodal catalyst system is a supported catalyst system. When each catalyst compound is supported, the catalyst compounds may reside on the same support material (e.g., same particles), or on different support materials (e.g., different particles). The bimodal catalyst system includes mixtures of unsupported catalyst compounds in slurry form and/or solution form. The support material may be a silica (e.g., fumed silica), alumina, a clay, or talc. The fumed silica may be hydrophilic (untreated), alternatively hydrophobic (treated). In some aspects the support is the hydrophobic fumed silica, which may be prepared by treating an untreated fumed silica with a treating agent such as dimethyldichlorosilane, a polydimethylsiloxane fluid, or hexamethyldisilazane. In some aspects the treating agent is dimethyldichlorosilane.

The trim catalyst may be any one of the aforementioned metallocene catalysts. For convenience the trim catalyst is fed into the reactor in solution in a hydrocarbon solvent (e.g., mineral oil or heptane). The hydrocarbon solvent may be an alkane, or a mixture of alkanes, wherein each alkane independently has from 5 to 20 carbon atoms, alternatively from 5 to 12 carbon atoms, alternatively from 5 to 10 carbon atoms. Each alkane independently may be acyclic or cyclic. Each acyclic alkane independently may be straight chain or branched chain. The acyclic alkane may be pentane, 1-methylbutane (isopentane), hexane, 1-methylpentane (isohexane), heptane, 1-methylhexane (isoheptane), octane, nonane, decane, or a mixture of any two or more thereof. The cyclic alkane may be cyclopentane, cyclohexane, cycloheptane, cyclooctane, cyclononane, cyclodecane, methycyclopentane, methylcyclohexane, dimethylcyclopentane, or a mixture of any two or more thereof.

For solubility in the hydrocarbon solvent, typically each of the group X of the trim catalyst independently is hydrocarbyl (e.g., benzyl, a $(C_1-C_5)$alkyl, or a $(C_2-C_5)$alkenyl; e.g., methyl or ethyl) or —$CH_2Si(CH_3)_3$. The groups X of the trim catalyst may be different than the X groups of the metallocene catalyst of the bimodal catalyst system. Nevertheless, upon activation by contact thereof with an activator, the active catalyst species resulting from the activation of the trim catalyst is essentially the same as the active catalyst species resulting from the activation of the metallocene catalyst of the bimodal catalyst system. For example, the metallocene catalyst of the bimodal catalyst system may be bis(n-butylcyclopentadienyl) zirconium dichloride (each X is Cl), and the trim catalyst may be bis(n-butylcyclopentadienyl) zirconium dialkyl (e.g., dimethyl wherein X is $CH_3$). Upon activation by treatment thereof with a suitable activator or cocatalyst, both the bis(n-butylcyclopentadienyl) zirconium dichloride and the bis(n-butylcyclopentadienyl) zirconium dimethyl effectively yield the same activated catalyst species.

Activator. Each catalyst of the bimodal catalyst system is activated by contacting it with the first activator. The trim catalyst is activated by contacting it with the bimodal catalyst system containing the first activator, alternatively separately by contacting it with the second activator. Additional activators may be used. Any activator may be the same or different as another and independently may be a Lewis acid, a non-coordinating ionic activator, or an ionizing activator, or a Lewis base, an alkylaluminum, or an alkylaluminoxane (alkylalumoxane). The alkylaluminum may be a trialkylaluminum, alkylaluminum halide, or alkylaluminum alkoxide (diethylaluminum ethoxide). The trialkylaluminum may be trimethylaluminum, triethylaluminum ("TEAl"), tripropylaluminum, or tris(2-methylpropyl)aluminum. The alkylaluminum halide may be diethylaluminum chloride. The alkylaluminum alkoxide may be diethylaluminum ethoxide. The alkylaluminoxane may be a methylaluminoxane (MAO), ethylaluminoxane, 2-methylpropylaluminoxane, or a modified methylaluminoxane (MMAO). Each alkyl of the alkylaluminum or alkylaluminoxane independently may be a $(C_1-C_7)$alkyl, alternatively a $(C_1-C_6)$alkyl, alternatively a $(C_1-C_4)$alkyl. The molar ratio of activator's metal (Al) to a particular catalyst compound's metal (catalytic metal, e.g., Zr) may be 1000:1 to 0.5:1, alternatively 300:1 to 1:1, alternatively 150:1 to 1:1. Suitable activators are commercially available.

Once the first activator and the (bis(2-(pentamethylphenylamido)ethyl)-amine zirconium dibenzyl and bis(butylcyclopentadienyl)zirconium dihalide) of the bimodal catalyst system contact each other, the catalysts of the bimodal catalyst system are activated and a first activator species may be made in situ. Once the second activator and the trim catalyst (a bis(butylcyclopentadienyl)zirconium dialkyl) contact each other, the trim catalyst is activated and a second activator species may be made in situ. The activator species may have a different structure or composition than the activator from which it is derived and may be a by-product of the activation of the catalyst or may be a derivative of the by-product. The corresponding activator species may be a derivative of the Lewis acid, non-coordinating ionic activator, ionizing activator, Lewis base, alkylaluminum, or alkylaluminoxane, respectively. An example of the derivative of the by-product is a methylaluminoxane species that is formed by devolatilizing during spray-drying of a bimodal catalyst system made with methylaluminoxane.

Each contacting step between activator and catalyst independently may be done either (a) in a separate vessel outside the GPP reactor (e.g., outside the FB-GPP reactor), (b) in a feed line to the GPP reactor, and/or (c) inside the GPP reactor (in situ). In option (a) the bimodal catalyst system, once its catalysts are activated, may be fed into the GPP reactor as a dry powder, alternatively as a slurry in a non-polar, aprotic (hydrocarbon) solvent. In option (c) the bimodal catalyst system may be fed into the reactor prior to activation via a first feed line, the first activator may be fed into the reactor via a second feed line, the trim catalyst may be fed into the reactor via a third feed line, and the second activator may be fed into the reactor via a fourth feed line. Any two of the first to fourth feed lines may be the same or different. The activator(s) may be fed into the reactor in "wet mode" in the form of a solution thereof in an inert liquid such as mineral oil or toluene, in slurry mode as a suspension, or in dry mode as a powder. Each contacting step may be done in separate vessels, feed lines, or reactors at the same or different times, or in the same vessel, feed line, or reactor at different times, to separately give the bimodal catalyst system and trim catalyst. Alternatively, the contacting steps may be done in the same vessel, feed line, or reactor at the same time to give a mixture of the bimodal catalyst system and trim catalyst in situ.

Bimodal Ethylene-Co-1-Butene ("BiEtBu") Copolymer

Ethylene. A polymerizable monomer of formula $H_2C=CH_2$.

1-butene. A polymerizable monomer of formula $H_2C=C(H)CH_2CH_3$.

Bimodal ethylene-co-1-butene copolymer. A macromolecule, or collection of macromolecules, composed of repeat units wherein 50.0 to <100 mole percent (mol %), alternatively 70.0 to 99.99 mol %, alternatively 95.0 to 99.9 mol % of such repeat units are derived from ethylene monomer, and from >0 to 50.0 mol %, alternatively from 0.01 to 30.0 mol %, alternatively 0.1 to 5.0 mol % of the remaining repeat units are comonomeric units derived from 1-butene comonomer; or collection of such macromolecules. The collection of macromolecules is characterized by two distinct peaks (not shoulders) in a plot of dW/d Log(MW) on the y-axis versus Log(MW) on the x-axis to give a Gel Permeation Chromatograph (GPC) chromatogram, wherein Log(MW) and dW/d Log(MW) are as defined below and measured by Gel Permeation Chromatograph (GPC) Test Method described herein.

The BiEtBu copolymer is a high molecular weight high density polyethylene (HMW HDPE). The BiEtBu copolymer may be further characterized by any one of the following limitations: a weight-average molecular weight ($M_w$) from 200,000.0 to 400,000.0 grams per mole (g/mol), alternatively 250,000.0 to 320,000.0 g/mol; a number-average molecular weight ($M_n$) from 6,000.0 to 11,000.0 g/mol, alternatively 7,000.0 to 9,000.0 g/mol; a z-average molecular weight ($M_z$) from 1,200,000.0 to 2,500,000.0 g/mol; a combination of any two thereof; and a combination of all three thereof; all measured according to the Gel Permeation Chromatography (GPC) Test Method.

Melt elasticity of the BiEtBu copolymer can be thought of as the behavior of a melt of the copolymer during a shaping process such as extrusion or film formation. It is one of the determinants of viscoelastic melt behavior, wherein viscosity decreases with increasing shear rate. Unsatisfactory melt elasticity may undesirably cause die swell during extrusion or problems with bubble stability during film blowing. A measure of, or proxy for, melt elasticity used herein is a ratio of melt storage modulus (G') value to melt loss modulus (G") that is measured using DMA (Dynamic Mechanical Analysis) on polymer melts at 190° C. by performing small-strain (10%) oscillatory shear at varying frequency from 100 radians per second (rad/s) to about 0.1 rad/s using an ARES-G2 Advanced Rheometric Expansion System, from TA Instruments, with parallel-plate geometry to obtain the G'/G" ratio value at a dynamic frequency equal to 0.1 rad/s.

The BiEtBu copolymer, film, and methods of making same are free of Ti and Cr metals, alternatively free of Ti, Hf, and Cr metals.

The polymerizing conditions in the method of synthesizing are effective for making the BiEtBu copolymer characterized by the melt space described earlier and, the resin properties and/or film properties.

Film

The film may be unembossed or embossed. The film may be tailored for specific uses by adjusting thickness of the film, combination with other films or additives, or not. The film may be a monolayer film. The film may have a thickness from 0.0051 to 0.051 mm (0.200 mil to 2 mils), alternatively from 0.0077 mm to 0.051 mm (0.300 mil to 2 mils), alternatively from 0.0077 mm to 0.0254 mm (0.300 mil to 1.00 mils), alternatively from 0.0077 mm to 0.0203 mm (0.300 mil to 0.80 mils), alternatively from 0.0077 mm to 0.0152 mm (0.300 mil to 0.6 mils).

The film may be made using any extrusion or co-extrusion methods including blown, tentered, and cast film methods. The blown film may be made on a blown-film-line machine configured for making polyethylene films. The machine may be configured with a feed hopper in fluid communication with an extruder in heating communication with a heating device capable of heating a polyethylene in the extruder to a temperature of up to 500° C. (e.g., 430° C.), and wherein the extruder is in fluid communication with a die having an inner diameter of 10.2 to 20.3 centimeters (4 to 8 inches) and a fixed die gap (e.g., 1.0 to 1.5 millimeter gap (39 to 59 mils)), a blow up ratio of 3:1 to 5:1, and a stalk Neck Height (NH)-to-die diameter of 8:1 to 9:1. Step (a) may be done in the feed hopper.

The film may be unoriented, uniaxially oriented, or biaxially oriented. The uniaxially film may be oriented in the direction of extrusion (machine direction or MD), alternatively in the direction transverse to the direction of extrusion (transverse direction or TD). The biaxially oriented film may be oriented in both MD and TD by stretching or pulling in the MD, simultaneously or followed by stretching or pulling in the TD.

The film may have one or more improved properties such as enhanced (increased) bubble stability, enhanced (increased) MD and/or TD Elmendorf Tear performance, enhanced (increased) MD tensile strength and/or TD tensile strength, enhanced (increased) dart impact performance, or a combination of any two or more thereof.

The film may constitute a layer of a multilayer film or laminate.

The (blown) film may optionally contain zero, one or more film additives. The "film additive" is a compound or material other than a polyolefin polymer that imparts one or more properties to, and/or enhances one or more properties of, the blown film. Examples of film additives are antimicrobial agents, antioxidants, catalyst neutralizers (of single site catalysts), colorants, and light stabilizers. The film additive(s), when present, may be pre-mixed with the BiEtBu copolymer prior to the melting step in the method of making the blown film. Alternatively, the film additive(s) may be added to the melt of the BiEtBu copolymer during or after the melting step and prior to the extruding step in the method of making the blown film. When two or more film additives are used, one or more film additives may be pre-mixed with the BiEtBu copolymer prior to the melting step in the method of making the blown film and a one or more film additives may be added to the melt of the BiEtBu copolymer during or after the melting step and prior to the extruding step in the method of making the blown film. The blown film may consist essentially of the BiEtBu copolymer, at least one antioxidant, and at least one catalyst neutralizer.

The film is useful for making containers and wraps that have enhanced puncture resistance. Examples of such containers are bags such as ice bags and grocery bags. Examples of such wraps are stretch films, meat wraps, and food wraps. The inventive copolymer is also useful in a variety of non-film related applications including in vehicle parts.

Alternatively precedes a distinct embodiment. ASTM means the standards organization, ASTM International, West Conshohocken, Pennsylvania, USA. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, North Carolina, USA). May confers a permitted choice, not an imperative. Operative means functionally capable or effective. Optional(ly) means is absent (or excluded), alternatively is present (or included). Properties may be measured using standard test methods and conditions. Ranges include endpoints, subranges, and whole and/or fractional values subsumed therein, except a range of integers does not include fractional values. Room temperature: 23° C.±1° C.

EXAMPLES

Bimodality Test Method: determine presence or absence of resolved bimodality by plotting dWf/d Log M (mass detector response) on y-axis versus Log M on the x-axis to obtain a GPC chromatogram curve containing local maxima log(MW) values for LMW and HMW polyethylene component peaks, and observing the presence or absence of a local minimum between the LMW and HMW polyethylene component peaks. The dWf is change in weight fraction, d Log M is also referred to as d Log(MW) and is change in logarithm of molecular weight, and Log M is also referred to as Log(MW) and is logarithm of molecular weight.

Bubble Stability Test Method: Measured bubble stabilities of films according to the following method: (a) bubble rating at standard output rate of 6.9 kilograms per hour-centimeter (kg/hour-cm, bubble rating STD); (b) a bubble rating at standard output rate with maximum line speed greater than 76.2 meters per minute (m/min., bubble rating MLS); and (c) bubble rating at maximum output rate (20% or more output rate, bubble rating MOR). In some tests MLS is 76.2 m/min. (250 ft/min.), alternatively 106.7 m/min. (350 ft/min.). Bubble ratings were scored on a scale from 1 to 5 as follows: 1. Film could not be made. 2. Film could be made but production of film had bubble instability. 3. Film could be made but production of film had slight bubble instability. 4. Film could be made with bubble stability. 5. Film could be made with very stable bubble. If the lowest bubble rating is 4 or 5 for MLS, STD, and MOR, the resin passes the bubble stability test and is characterized by an overall rating of "Good". If the lowest bubble rating for MLS, STD, and MOR is 3, the resin passes the bubble stability test and is characterized by an overall rating of "Okay". If the lowest bubble rating for MLS, STD, and MOR is 2, the resin fails the bubble stability test and is characterized by an overall rating of "Unsatisfactory". If the lowest bubble rating for MLS, STD, and MOR is 1, the resin fails the bubble stability test and is characterized by an overall rating of "Poor".

Dart Impact Test Method: measured according to ASTM D1709-16a, *Standard Test Methods for Impact Resistance of Plastic Film by the Free-Falling Dart Test Method*, Method A. Method A employs a dart with a 38.10±0.13-mm (1.500±0.005-in.) diameter hemispherical head dropped from a height of 0.66±0.01 m (26.0±0.4 in.). This test method can be used for films whose impact resistances require masses of about 50 g or less to about 6 kg to fracture them. Results expressed in grams (g).

Deconvoluting Test Method: segment the chromatogram obtained using the Bimodality Test Method into nine (9) Schulz-Flory molecular weight distributions. Such deconvolution method is described in U.S. Pat. No. 6,534,604. Assign the lowest four MW distributions to the LMW polyethylene component and the five highest MW distributions to the HMW polyethylene component. Determine the respective weight percents (wt %) for each of the LMW and HMW polyethylene components in the BiEtBu copolymer by using summed values of the weight fractions (Wf) of the LMW and HMW polyethylene components and the respective number average molecular weights ($M_n$) and weight average molecular weights ($M_w$) by known mathematical treatment of aggregated Schulz-Flory MW distributions.

Density is measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

Elmendorf Tear Test Method: measured according to ASTM D1922-09, *Standard Test Methods for Propagation Tear Resistance of Plastic Film and Thin Sheeting by Pendulum Method*, Type B (constant radius). (Technically equivalent to ISO 6383-2.) Report results as normalized tear in cross direction (CD) or machine direction (MD) in gram-force (gf).

Film Puncture Test Method: ASTM D5748-95(2012), *Standard Test Method for Protrusion Puncture Resistance of Stretch Wrap Film*. Determines the resistance to puncture of a film as resistance to penetration of the film by a probe impinging the film at a standard speed such as 250 millimeters per minute (mm/min.). The probe is coated with a polytetrafluoroethylene and has an outer diameter of 1.905 cm (0.75 inch). The film is clamped during the test. The probe eventually penetrates or breaks the clamped film. The peak force at break, i.e., the maximum force, energy (work) to break or penetrate the clamped film, and the distance that the probe has penetrated at break, are recorded using mechanical testing software. The probe imparts a biaxial stress to the clamped film that is representative of the type of stress encountered by films in many product end-use applications. This resistance is a measure of the energy-absorbing ability of a film to resist puncture under these conditions.

Gauge Variation Test Method: determined according to ASTM D8136-17, *Standard Test Method for Determining Plastic Film Thickness and Thickness Variability Using a Non-Contact Capacitance Thickness Gauge*. Prior to testing, samples are conditioned at 23°±2° C. and 50%±10% relative humidity (RH) for at least 40 hours (per ASTM D618), and then tested under the same conditions The Gauge Variation is calculated using the following equation: (Thickness standard deviation/average thickness)×100%.

Gel permeation chromatography (GPC) Test Method: Weight-Average Molecular Weight Test Method: determine $M_w$, number-average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (μL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X + 1} + \frac{a_{PS} + 1}{a_X + 1} \log M_{PS},$$

where subscript "X" stands for the test sample, subscript "PS" stands for PS standards, $a_{PS}$=0.67, $K_{PS}$=0.000175, and $a_x$ and $K_x$ are obtained from published literature. For polyethylenes, $a_X/K_X$=0.695/0.000579. For polypropylenes $a_X/K_X$=0.705/0.0002288. At each point in the resulting chromatogram, calculate concentration, c, from a baseline-subtracted DRI signal, $I_{DRI}$, using the following equation: $c=K_{DRI}I_{DRI}/(dn/dc)$, wherein $K_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/d Log(MW) on the y-axis versus Log(MW) on the x-axis to give a GPC chromatogram, wherein Log(MW) and dW/d Log(MW) are as defined above.

High Load Melt Index (HLMI) $I_{21}$ Test Method: use ASTM D1238-13, *Standard Test Method for Melt Flow Rates of Thermoplastics by Extrusion Platometer*, using conditions of 190° C./21.6 kilograms (kg). Report results in units of grams eluted per 10 minutes (g/10 min.).

Melt Index ("$I_2$") Test Method: for ethylene-based (co)polymer is measured according to ASTM D1238-13, using conditions of 190° C./2.16 kg, formerly known as "Condition E".

Melt Index $I_5$ ("$I_5$") Test Method: use ASTM D1238-13, using conditions of 190° C./5.0 kg. Report results in units of grams eluted per 10 minutes (g/10 min.).

Melt Flow Ratio MFR5: ("$I_{21}/I_5$") Test Method: calculated by dividing the value from the HLMI $I_{21}$ Test Method by the value from the Melt Index $I_5$ Test Method.

Melt Elasticity Test Method: On polymer melts at 190° C. perform small-strain (10%) oscillatory shear at varying frequency from 100 radians per second (rad/s) to about 0.1 rad/s using an ARES-G2 Advanced Rheometric Expansion System, from TA Instruments, with parallel-plate geometry to obtain the G'/G" ratio value at a dynamic frequency equal to 0.1 rad/s.

Antioxidants: 1. Pentaerythritol tetrakis(3-(3,5-di(1',1'-dimethylethyl)-4-hydroxyphenyl)propionate); obtained as IRGANOX 1010 from BASF. 2. Tris(2,4-di(1',1'-dimethylethyl)-phenyl)phosphite. Obtained as IRGAFOS 168 from BASF.

Catalyst Neutralizers: 1. Calcium stearate. 2. Zinc stearate.

Bimodal Catalyst system: the PRODIGY™ BMC-300 catalyst system. Obtained from Univation Technologies LLC, Houston, Texas, USA.

Trim catalyst: bis(butylcyclopentadienyl)zirconium dimethyl obtained as UT-TR-300 trim catalyst from Univation Technologies LLC, Houston, Texas, USA.

Comonomer: 1-butene. See later for $C_4/C_2$ gas molar ratio.

Ethylene ("$C_2$"): See later for partial pressure of $C_2$.

Molecular hydrogen gas ("$H_2$"): See later for $H_2/C_2$ gas molar ratio.

Inventive Examples 1 to 7 (IE1 to IE7): polymerization procedure: Runs began with PRODIGY™ BMC-300 Bimodal Catalyst and comonomer 1-butene according to the Pilot Reactor and method described earlier to give in different parts, as described below, different embodiments of the BiEtBu copolymer as granular resins and having targeted properties of high load melt index ($I_{21}$) 8.2 to 10.0 g/10 minutes, melt flow ratio $I_{21}/I_5$ from 27.5 to 33.8, a melt index $I_5$ from 0.29 to 0.34 g/10 min., and density 0.949 g/cm³; and melt elasticity 0.58 to 0.64 after post-reactor oxygen tailoring. The polymerization operating conditions and post-reactor oxygen tailoring levels are reported below in Table 1 (IE1 to IE4) or Table 2 (IE5 to IE7).

TABLE 1

Operating conditions for IE1 to IE4.

| | IE1 | IE2 | IE3 | IE4 |
|---|---|---|---|---|
| PART No. | 1 | 1 | 1 | 1 |
| Reactor Type | S,CM, PP, FB GPP* | S,CM, PP, FB GPP | S,CM, PP, FB GPP | S,CM, PP, FB GPP |
| Reactor Purging gas | Anhydrous $N_2$ | Anhydrous $N_2$ | Anhydrous $N_2$ | Anhydrous $N_2$ |
| Bed Temp. (° C.) | 90.0 | 90.0 | 90.0 | 90.0 |
| Rx Pressure (kpa)ˆ | 2420 | 2420 | 2420 | 2420 |
| $C_2$ Partial Pressure (kpa) | 1512 | 1512 | 1512 | 1512 |
| $H_2/C_2$ Molar Ratio | 0.0042 | 0.0042 | 0.0042 | 0.0042 |
| $C_4/C_2$ Molar Ratio | 0.0133 | 0.0133 | 0.0133 | 0.0133 |
| Induced Conden. Agent 1-methylbutane (mol %) | 11 | 11 | 11 | 11 |
| Superficial Gas Velocity (m/sec) | 0.61 | 0.61 | 0.61 | 0.61 |
| Bimodal Catalyst System | PRODIGY™ BMC-300 | PRODIGY™ BMC-300 | PRODIGY™ BMC-300 | PRODIGY™ BMC-300 |
| Trim catalyst | UT-TR-300 | UT-TR-300 | UT-TR-300 | UT-TR-300 |
| Catalyst Zr conc. (wt %) | 0.43 | 0.43 | 0.43 | 0.43 |
| Catalyst Al conc. (wt %) | 17.6 | 17.6 | 17.6 | 17.6 |
| Starting seedbed = granular HDPE resin | Preloaded | Preloaded | Preloaded | Preloaded |
| Fluidized Bed Weight (kg) | 54 | 54 | 54 | 54 |
| Copolymer Production Rate (kg/hour) | 18 | 18 | 18 | 18 |

TABLE 1-continued

Operating conditions for IE1 to IE4.

|  | IE1 | IE2 | IE3 | IE4 |
|---|---|---|---|---|
| Copolymer Residence Time (hour) | 3 | 3 | 3 | 3 |
| Copolymer Fluid Bulk Density, (kg/m³) | 332 | 332 | 332 | 332 |
| $O_2$ tailoring level (%) (in LCM100 Extruder) | 4.44 | 6.4 | 8.5 | 8.8 |
| Residual Zr (ppmw) | 1.4 | 1.4 | 1.4 | 1.4 |

*S,CM, PP, FB, GPP: single, continuous mode, pilot pant, fluidized bed gas phase polymerization.
^Rx Pressure (kPa): reactor total pressure in kilopascals.

TABLE 2

Operating conditions for IE5 to IE7.

|  | IE5 | IE6 | IE7 |
|---|---|---|---|
| PART No. | 2 | 2 | 2 |
| Reactor Type | S,CM, PP, FB GPP | S,CM, PP, FB GPP | S,CM, PP, FB GPP |
| Reactor Purging gas | Anhydrous $N_2$ | Anhydrous $N_2$ | Anhydrous $N_2$ |
| Bed Temp. (° C.) | 90.0 | 90.0 | 90.0 |
| Rx Pressure (kpa)^ | 2416 | 2416 | 2416 |
| $C_2$ Partial Pressure (kpa) | 1517 | 1517 | 1517 |
| $H_2/C_2$ Molar Ratio | 0.0042 | 0.0042 | 0.0042 |
| $C_4/C_2$ Molar Ratio | 0.0133 | 0.0133 | 0.0133 |
| Induced Condensing Agent 1-methylbutane (mol %) | 5 | 5 | 5 |
| Superficial Gas Velocity (m/sec) | 0.64 | 0.64 | 0.64 |
| Bimodal Catalyst System | PRODIGY ™ BMC-300 | PRODIGY ™ BMC-300 | PRODIGY ™ BMC-300 |
| Trim catalyst | UT-TR-300 | UT-TR-300 | UT-TR-300 |
| Catalyst Zr concentration (wt %) | 0.43 | 0.43 | 0.43 |
| Catalyst Al concentration (wt %) | 17.6 | 17.6 | 17.6 |
| Starting seedbed = granular HDPE resin | Preloaded | Preloaded | Preloaded |
| Fluidized Bed Weight (kg) | 55 | 55 | 55 |
| Copolymer Production Rate (kg/hour) | 18 | 18 | 18 |
| Copolymer Residence Time (hour) | 3 | 3 | 3 |
| Copolymer Fluid Bulk Density, (kg/m³) | 333 | 333 | 333 |
| $C_2$ tailoring level (%) (in LCM100 Extruder) | 4.04 | 7.4 | 8.2 |
| Residual Zr (ppmw) | 1.7 | 1.7 | 1.7 |

*S,CM, PP, FB, GPP: single, continuous mode, pilot plant, fluidized bed gas phase polymerization.
^Rx Pressure (kPa): reactor total pressure in kilopascals.

As shown in Tables 1 and 2, the operating conditions used to make the BiEtBu copolymers of IE1 to IE7 comprise a bed temperature of 90.0° C.; an ethylene ($C_2$) partial pressure of 1512 to 1517 kpa; an $H_2/C_2$ Molar Ratio 0.0042; a $C_4/C_2$ Molar Ratio of 0.0133; a superficial gas velocity from 0.61 to 0.64 m/sec (meter per second); and a post-reactor oxygen tailoring level from 4.04% to 8.8%. In certain embodiments, the method of synthesizing the BiEtBu copolymer employ any one, alternatively any five, alternatively each of the aforementioned operating conditions.

Formulation and Pelletization Procedure: Each of the different granular resins of IE1 to IE7 was separately mixed with 800 parts per million weight/weight (ppm) of Antioxidant 1, 200 ppm Antioxidant 2, 1,000 ppm Catalyst Neutralizer 1, and 500 ppm Catalyst Neutralizer 2 in a ribbon blender, and then compounded into strand cut pellets using a twin-screw extruder LCM100 according to the methods described in U.S. Pat. Nos. 5,728,335; 6,456,976; and 6,989,423. The resulting pellets of each resin were tested for HLMI ($I_{21}$), MFR5 ($I_{21}/I_5$), melt elasticity and density according to their aforementioned respective test methods. Results are reported later. In certain embodiments, the BiEtBu copolymer further comprises at least one antioxidant selected from Antioxidants 1 and 2; at least one catalyst neutralizer selected from Catalyst Neutralizers 1 and 2; or a combination thereof. Results are reported below in Table 3, which also includes the post-reactor oxygen ($O_2$) tailoring level again for convenience.

TABLE 3

Melt properties of IE1 to IE7.

| Test | IE1 | IE2 | IE3 | IE4 | IE5 | IE6 | IE7 |
|---|---|---|---|---|---|---|---|
| $O_2$ tailoring level (%) (in LCM100 Extruder) | 4.4 | 6.4 | 8.5 | 8.8 | 4.04 | 7.4 | 8.2 |
| $I_{21}$ (190° C., 21.6 kg) (g/10 min.) | 8.7 | 10.0 | 8.2 | 8.6 | 10.0 | 9.4 | 9.0 |
| MFR5 ($I_{21}/I_5$) | 28.2 | 33.8 | 28.7 | 27.8 | 29.7 | 30.6 | 27.5 |
| melt elasticity (G'/G"@0.1 rad/s) (Pa) | 0.58 | 0.60 | 0.61 | 0.63 | 0.61 | 0.63 | 0.64 |

TABLE 3-continued

Melt properties of IE1 to IE7.

| Test | IE1 | IE2 | IE3 | IE4 | IE5 | IE6 | IE7 |
|---|---|---|---|---|---|---|---|
| $I_2$ (190° C., 2.16 kg) (g/10 min.) | 0.07 | 0.07 | 0.07 | 0.07 | 0.09 | N/a | 0.08 |
| $I_5$ (190° C., 5.0 kg) (g/10 min.) | 0.31 | 0.30 | 0.29 | 0.31 | 0.34 | 0.31 | 0.33 |

N/a means not availabe. As shown in Table 3, the melt properties of the BiEtBu copolymers of IE1 to IE7 comprise a high-load melt index $I_{21}$ (190° C., 21.6 kg) from 8.2 to 10.0 g/10 min.; a melt flow ratio MFR5 ($I_{21}/I_5$) from 27.5 to 33.8; a melt elasticity (G'/G"@0.1 rad/s) from 0.58 to 0.64 Pa; a melt index $I_2$ (190° C., 2.16 kg) from 0.01 to 0.09 g/10 min.; and a melt index $I_5$ (190° C., 5.0 kg) from 0.29 to 0.34 g/10 min.). In certain embodiments, the BiEtBu copolymer is characterized by any one, alternatively all but one, alternatively each of the aforementioned melt properties.

The melt properties data in Table 3 for the BiEtBu copolymer were analyzed to discover on what reactor/process operating conditions the melt properties depend. The following operating conditions are found to influence the melt properties of the BiEtBu copolymer made thereby: decreasing reactor bed temperature (e.g., from 97° to 90.0° C.) increasing $H_2/C_2$ gas molar ratio in the process yielded inventive BiEtBu copolymer beneficially having a melt property space enhanced for use in blown film processes and for making blown films.

Granular resins of IE1 to IE7 were characterized by density; component molecular weight spread ($M_{w\text{-}HMW}/M_{w\text{-}LMW}$ ratio); component fraction split; molecular weights; and molecular mass dispersity ($M_w/M_n$), $Đ_M$. Results are reported below in Table 4.

TABLE 4

Resin properties of IE1 to IE7.

| Test | IE1 | IE2 | IE3 | IE4 | IE5 | IE6 | IE7 |
|---|---|---|---|---|---|---|---|
| Density (g/cm³) | 0.949 | 0.949 | 0.949 | 0.949 | 0.949 | 0.949 | 0.949 |
| HMW Component Split (wt %) | 57.6 | 58.5 | 57.7 | 57.2 | 56.0 | 57.4 | 57.0 |
| LMW Component Split (wt %) | 42.4 | 41.5 | 42.3 | 42.8 | 44.0 | 42.6 | 43.0 |
| $M_{w\text{-}HMW}/M_{w\text{-}LMW}$ ratio | 39.5 | 39.1 | 39.3 | 39.3 | 38.7 | 41.2 | 40.9 |
| $M_{w\text{-}HMW}$ (kg/mol) | 455 | 454 | 457 | 456 | 453 | 460 | 457 |
| $M_n$ (kg/mol) | 7.1 | 7.8 | 7.4 | 7.4 | 7.1 | 7.1 | 7.0 |
| $M_w$ (kg/mol) | 286 | 286 | 278 | 277 | 282 | 282 | 274 |
| $M_w/M_n$ ($Đ_M$) | 40.3 | 36.7 | 37.7 | 37.5 | 39.8 | 40.0 | 39.4 |
| $M_z$ (kg/mol) | 2,348 | 2,244 | 2,083 | 2,137 | 2,333 | 2,229 | 2,088 |

As shown in Table 4, the resin properties of the BiEtBu copolymers of IE1 to IE7 comprise a density of 0.949 g/cm³; a high molecular weight (HMW) component split from 56.0 to 58.5 wt %; a low molecular weight (LMW) component split from 44.0 to 41.5 wt %; a weight-average molecular weight of the high molecular weight component ($M_{w\text{-}HMW}$) from 453,000 to 460,000 g/mol; a number-average molecular weight from 7,000 to 7,800 g/mol; a weight-average molecular weight from 274,000 to 286,000 g/mol; a molecular mass dispersity $M_w/M_n$ ($Đ_m$) from 36.7 to 40.3; and a z-average molecular weight from 2,083,000 to 2,348,000 g/mol. In certain embodiments, the BiEtBu copolymer is characterized by any one, alternatively all but one, alternatively each of the aforementioned resin properties.

Film Forming Procedure: Pellets of granular resins of the BiEtBu copolymer of IE1 to IE7 are separately melted at melt temperature described herein, and separately blown into films using an Alpine 50 millimeter (mm) 25:1 length to diameter (L/D) dimensioned barrier single screw extruder, a 120 mm inner diameter die, a 1.2 mm die gap, without IBC (internal bubble cooling). The gauge variation, dart impact, and bubble stability properties were measured on films having a thickness of 0.0127 millimeter (mm)=12.7 micrometer (μm) and according to the aforementioned test methods. See below Table 5.

TABLE 5

Film properties of IE1 to IE7.

| Test | IE1 | IE2 | IE3 | IE4 | IE5 | IE6 | IE7 |
|---|---|---|---|---|---|---|---|
| Extruder speed (rpm) | 97 | 97 | 95 | 96 | 97 | 97 | 97 |
| Motor load (%) | 68.6 | 67.2 | 69.1 | 67.8 | 66.0 | 67.4 | 66.4 |
| Melt temp. (° C.) | 197 | 195 | 197 | 196 | 195 | 196 | 196 |
| Die Press (MPa) | N/a | N/a | N/a | N/a | N/a | N/a | N/a |
| Gauge Variation (%) | 11 | 12 | 11 | 15 | 11 | 11 | 14 |
| Dart Impact (g) | 382 | 322 | 391 | 334 | 295 | 352 | 334 |
| Bubble Rating STD | 4 | 4 | 5 | 5 | 4 | 4 | 4 |
| Bubble Rating @ 250 MLS | 4 | 4 | 4 | 4 | 3 | 3 | 3 |
| Bubble Rating @ 350 MLS | 4 | 3 | 4 | 4 | 1 | 3 | 2 |
| Bubble Rating MOR | 4 | 4 | 4 | 4 | 4 | 4 | 4 |
| Overall Bubble Rating | Good | Okay | Good | Good | Poor | Okay | Unsatisfactory |

N/a means not available. As shown in Table 5, the film properties of the blown films of the BiEtBu copolymers of IE1 to IE7 comprise a gauge variation from 11% to 15%, a dart impact from 295 to 391 g, and a bubble stability rating at MLS 76.2 m/min. (250 ft./min.) of 3 or 4 (maximum is 5). In certain embodiments, the BiEtBu copolymer, and the blown films thereof, are independently characterized by any one, alternatively all but one, alternatively each of the aforementioned film properties. In some aspects the BiEtBu copolymer is selected from IE1 to IE4 and IE6.

Comparative Examples 1 to 4 (CE1 to CE4) of comparative bimodal ethylene-co-1-butene copolymers were prepared using a reactor bed temperature of 97° C., PRODIGY™ BMC-300 catalyst system and target density is 0.948 to 0.950 g/cm³ and target HLMI ($I_{21}$) is 8 to 10 g/10 minutes. The comparative resins were characterized by density, melt elasticity (G'/G"@0.1 rad/s), and HMW component Mw. The comparative resins were prepared as blown films and evaluated for gauge variation, dart impact and bubble stability as described earlier for IE1. Results are shown in Table 6.

TABLE 6

Comparative Film properties of comparative CE1 to CE4.

| Test | CE1 | CE2 | CE3 | CE4 |
|---|---|---|---|---|
| Density (g/cm³) | 0.949 | 0.949 | 0.949 | 0.949 |
| HLMI (g/10 min.) | 8.7 | 9.4 | 8.4 | 9.1 |
| melt elasticity (G'G"@0.1 rad/s) (Pa) | 0.54 | 0.49 | 0.53 | 0.51 |
| Resin $M_{w\text{-}HMW}$ (kg/mol) | 372 | 381 | 378 | 379 |
| Extruder speed (rpm) | 97 | 97 | 97 | 97 |
| Motor load (° C.) | 70.5 | 69.3 | 70.7 | 69.5 |
| Melt temp. (° C.) | 201 | 201 | 203 | 202 |
| Die Press (MPa) | 50 | 50 | 51 | 51 |
| Gauge variation (%) | 13 | 13 | 17 | 19 |
| Dart impact (g) | 244 | 208 | 268 | 262 |
| Bubble Rating STD | 3 | 3 | 4 | 4 |
| Bubble Rating @ 250 MLS | 3 | 3 | 3 | 3 |
| Bubble Rating @ 350 MLS | 3 | 3 | 3 | 3 |
| Bubble Rating MOR | 3 | 3 | 3 | 4 |
| Overall Bubble Rating | Okay | Okay | Okay | Okay |

As shown in Table 6, the comparative resin and film properties of CE1 to CE4 are inferior for dart impact and generally inferior for gauge variation and Bubble rating.

The invention claimed is:

1. A bimodal ethylene-co-1-butene copolymer consisting essentially of a higher molecular weight (HMW) component and a lower molecular weight (LMW) component and, when in melted form at 190° C., exhibits a melt property space defined by a combination of high-load melt index ("HLMI" or "$I_{21}$"), melt flow ratio $I_{21}/I_5$ ("MFR5"), and melt elasticity (G'/G"@0.1 rad/s) properties, wherein the HLMI is 8.0 to 12.0 grams per 10 minutes (g/10 min); the MFR5 is 25.0 to 37.0, wherein the $I_{21}$ and $I_5$ values used to calculate the MFR5 are each in g/10 min and are measured according to ASTM D1238-13 (190° C., 21.6 kg, "$I_{21}$"; and 190° C., 5.0 kg, "$I_5$", respectively), and the melt elasticity is 0.55 to 0.68, and wherein melt elasticity=G'/G" determined at 0.1 radian per second (rad/s) according to Melt Elasticity Test Method; and wherein the HMW component has a weight-average molecular weight ($M_{w\text{-}HMW}$) greater than 425,000 g/mol; wherein the bimodal ethylene-co-1-butene copolymer has a component molecular weight spread characterized by a ratio of the weight-average molecular weight of the HMW component ($M_{w\text{-}HMW}$) to the weight-average molecular weight of the LMW component ($M_{w\text{-}LMW}$) from 35.0 to 45.0, measured according to the GPC Test Method.

2. The bimodal ethylene-co-1-butene copolymer of claim 1 wherein the melt property space of the bimodal ethylene-co-1-butene copolymer is further exhibiting any one of limitations (i) to (vii): (i) a melt index $I_2$ from 0.005 to 0.10 g/10 min measured according to ASTM D1238-13 (190° C., 2.16 kg, "$I_2$"); (ii) a melt index $I_5$ from 0.25 to 0.40 g/10 min measured according to ASTM D1238-13 (190° C., 5.0 kg, "$I_5$"); (iii) a melt flow ratio $I_{21}/I_2$ ("MFR2") from 100.0 to 150.0, wherein the $I_{21}$ and $I_2$ values used to calculate the MFR2 are each in g/10 min and are measured according to ASTM D1238-13 (190° C., 21.6 kg, "$I_{21}$"; and 190° C., 2.16 kg, "$I_2$"); (iv) both (i) and (ii); (v) both (i) and (iii); (vi) both (ii) and (iii); and (vii) each of (i) to (iii).

3. The bimodal ethylene-co-1-butene copolymer of claim 1 exhibiting any one of resin property limitations (i) to (xxxiii): (i) a density from 0.9410 to 0.9550 gram per cubic centimeter (g/cm³) measured according to ASTM D792-13, Method B; (ii) a component fraction split characterized by a weight fraction of the HMW component from 50.0 to 60.0 wt %; and a weight fraction of the LMW component fraction is from 50.0 to 40.0 wt % of the combined weight of the HMW and LMW components, measured according to the Gel Permeation Chromatography (GPC) Test Method; (iii) a component molecular weight spread wherein a ratio of the weight-average molecular weight of the HMW component ($M_{w\text{-}HMW}$) to the weight-average molecular weight of the LMW component ($M_{w\text{-}LMW}$) from 38.0 to 44.0, measured according to the GPC Test Method; (iv) a molecular mass dispersity ($M_w/M_n$), $Đ_M$, from 34 to 44, wherein $M_w$ and $M_n$ are measured according to the GPC Test Method; (v) the $M_{w\text{-}HMW}$ is from 435,000 to 465,000 g/mol measured according to the GPC Test Method; (vi) a number-average molecular weight ($M_n$) from 6,900.0 to 8,000.0 g/mol; (vii) a weight-average molecular weight ($M_w$) from 250,000.0 to 300,000.0 g/mol; (viii) a z-average molecular weight ($M_z$) from 1,800,000.0 to 2,500,000.0 g/mol; (ix) both (i) and (ii); (x) both (i) and (iii); (xi) both (i) and (iv); (xii) both (i) and (v); (xiii) both (i) and (vi); (xiv) both (i) and (vii); (xvi) both (i) and (viii); (xvii) both (ii) and (iii); (xviii) both (ii) and (iv); (xix) both (ii) and (v); (xx) both (ii) and (vi); (xxi) both (ii) and (vii); (xxii) both (ii) and (viii); (xxiii) both (iii) and (iv); (xxiv) both (iii) and (v); (xxv) both (iii) and (vi); (xxvi) both (iii) and (vii); (xxvii) both (iii) and (viii); (xxviii) both (iv) and (v); (xxix) both (iv) and (vi); (xxx) both (iv) and (vii); (xxxi) both (iv) and (viii); (xxxii) any seven of (i) to (viii); and (xxxiii) each of (i) to (viii).

4. The bimodal ethylene-co-1-butene copolymer of claim 1 that, when in the form of a blown film and having a thickness of 0.0127 millimeter exhibits any one of limitations (i) to (xii): (i) a dart impact from 271 to 401 grams (g) measured according to the Dart Impact Test Method; (ii) a gauge variation from 10.0% to 16% measured according to the Gauge Variation Test Method; (iii) a bubble stability rating, at maximum line speed (MLS) 76.2 meters per minute, of 3, 4, or 5 measured according to the Bubble Stability Test Method; (iv) an Elmendorf tear in cross direction (CD) from 60.0 to 190.0 gram-force (gf) and/or an Elmendorf tear in machine direction (MD) from 15 to 35 gf, measured according to the Elmendorf Tear Test Method; (v) both (i) and (ii); (vi) both (i) and (iii); (vii) both (i) and (iv); (viii) both (ii) and (iii); (ix) both (ii) and (iv); (x) both (iii) and (iv); (xi) any three of (i) to (iv); and (xii) each of (i) to (iv).

5. A method of synthesizing the bimodal ethylene-co-1-butene copolymer of claim 1, the method consisting essentially of (a) copolymerizing ethylene (monomer) and 1-butene (comonomer) with a combination of a bimodal catalyst system and a trim catalyst in the presence of molecular hydrogen gas ($H_2$) and, optionally, an induced condensing agent (ICA) in one polymerization reactor under effective polymerizing conditions to give an initial bimodal ethylene-co-1-butene copolymer, (b) removing the initial bimodal ethylene-co-1-butene copolymer from the polymerization reactor to give a removed bimodal ethylene-co-1-butene copolymer, and (c) oxygen tailoring the removed bimodal ethylene-co-1-butene copolymer to give an oxygen-tailored bimodal ethylene-co-1-butene copolymer, which is the bimodal ethylene-co-1-butene copolymer.

6. The method of claim 5 further consisting essentially of adding at least one additive to the oxygen-tailored bimodal ethylene-co-1-butene copolymer to give a formulation comprising the oxygen-tailored bimodal ethylene-co-1-butene copolymer and the at least one additive.

7. A manufactured article comprising the bimodal ethylene-co-1-butene copolymer of claim 1.

8. A film consisting essentially of the bimodal ethylene-co-1-butene copolymer of claim 1 and wherein the film at a thickness of 0.013 millimeter or greater has a dart impact of greater than 290 grams measured by the Dart Impact Test Method.

9. A method of making a blown film, the method comprising extruding a melt of the bimodal ethylene-co-1-butene copolymer of claim 1 through a die configured for forming a bubble so as to make a bubble of the bimodal ethylene-co-1-butene copolymer, and blowing (inflating) the bubble with a film-blowing machine, thereby making the blown film.

10. A blown film made by the method of claim 9 and consisting essentially of the bimodal ethylene-co-1-butene copolymer.

* * * * *